(12) United States Patent
Hincapie et al.

(10) Patent No.: US 12,264,930 B2
(45) Date of Patent: Apr. 1, 2025

(54) STABLE ORIENTATION CUES FOR AUGMENTED REALITY (AR)

(71) Applicant: Google LLC, Mountain View, CA (US)

(72) Inventors: Juan David Hincapie, Palo Alto, CA (US); Rachel Elizabeth Inman, New York, NY (US)

(73) Assignee: Google LLC, Mountain View, CA (US)

(*) Notice: Subject to any disclaimer, the term of this patent is extended or adjusted under 35 U.S.C. 154(b) by 866 days.

(21) Appl. No.: 17/260,295

(22) PCT Filed: Jul. 6, 2020

(86) PCT No.: PCT/US2020/040893
§ 371 (c)(1),
(2) Date: Jan. 14, 2021

(87) PCT Pub. No.: WO2022/010451
PCT Pub. Date: Jan. 13, 2022

(65) Prior Publication Data
US 2022/0178713 A1   Jun. 9, 2022

(51) Int. Cl.
*G01C 21/36* (2006.01)
*G06T 7/70* (2017.01)
*G06T 11/00* (2006.01)

(52) U.S. Cl.
CPC .......... *G01C 21/3602* (2013.01); *G06T 7/70* (2017.01); *G06T 11/00* (2013.01); *G06T 2207/30181* (2013.01)

(58) Field of Classification Search
CPC ..... G01C 21/20; G01C 21/3602; G06T 11/00; G06T 7/70; G06T 2207/30181
See application file for complete search history.

(56) References Cited

U.S. PATENT DOCUMENTS

| | | | |
|---|---|---|---|
| 6,366,856 B1* | 4/2002 | Johnson | G01C 17/28 701/454 |
| 8,239,130 B1* | 8/2012 | Upstill | G01C 21/3679 701/410 |
| 2006/0074549 A1* | 4/2006 | Takahashi | G01C 21/20 701/454 |

(Continued)

OTHER PUBLICATIONS

International Preliminary Report on Patentability for International Application No. PCT/US2020/040893 dated Jan. 19, 2023. 13 pages.

(Continued)

*Primary Examiner* — Stephen Holwerda
(74) *Attorney, Agent, or Firm* — Lerner David LLP

(57) ABSTRACT

The present disclosure provides systems and methods for determining the orientation of a device based on visible and/or non-visible orientation cues. The orientation cues may be a geographically located objects, such as a park, body of water, monument, building, landmark, etc. The orientation cues may be visible or non-visible with respect to the location of the device. The device may use one or more image sensors to detect the visible orientation cues. Non-visible orientation cues may be associated with map data. Using the location of the orientation cue and the distance of the orientation cue to the device, the orientation of the device may be determined. The device may then provide an output indicating the orientation of the device.

10 Claims, 11 Drawing Sheets

(56) References Cited

U.S. PATENT DOCUMENTS

| | | | |
|---|---|---|---|
| 2006/0195858 A1* | 8/2006 | Takahashi | G01C 21/3647 |
| | | | 725/19 |
| 2007/0162942 A1* | 7/2007 | Hamynen | G06F 3/011 |
| | | | 348/E7.071 |
| 2009/0293012 A1* | 11/2009 | Alter | G06F 3/011 |
| | | | 715/848 |
| 2011/0135207 A1* | 6/2011 | Flynn | G06V 20/70 |
| | | | 382/209 |
| 2011/0279446 A1* | 11/2011 | Castro | G06T 19/006 |
| | | | 345/419 |
| 2012/0072100 A1 | 3/2012 | Mate et al. | |
| 2012/0105474 A1* | 5/2012 | Cudalbu | G01C 21/3664 |
| | | | 701/300 |
| 2012/0114178 A1* | 5/2012 | Platonov | G01C 21/3602 |
| | | | 382/104 |
| 2012/0220308 A1* | 8/2012 | Ledlie | H04W 4/029 |
| | | | 455/456.1 |
| 2012/0221241 A1* | 8/2012 | Nurmi | G01C 21/20 |
| | | | 701/438 |
| 2014/0018094 A1* | 1/2014 | Oren | G01C 21/20 |
| | | | 455/456.1 |
| 2016/0240011 A1* | 8/2016 | Fedosov | G01C 21/3611 |

OTHER PUBLICATIONS

International Search Report and Written Opinion for International Application No. PCT/US2020/040893 dated Apr. 8, 2021. 18 pages.

\* cited by examiner

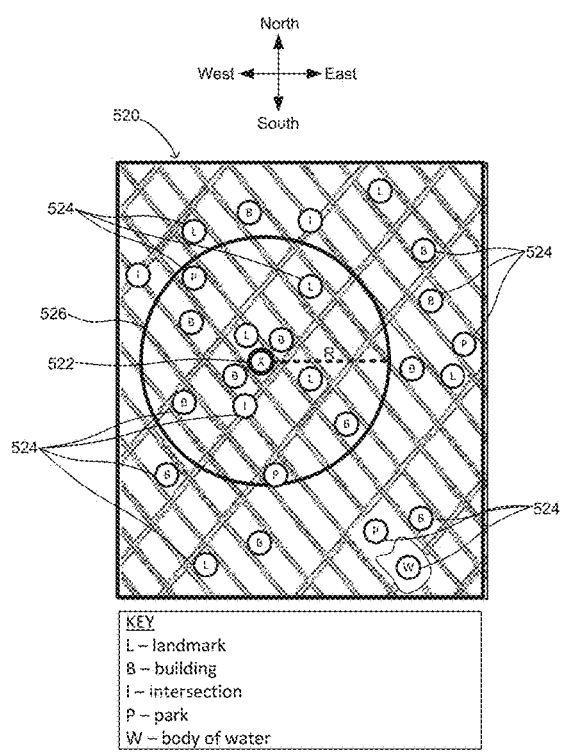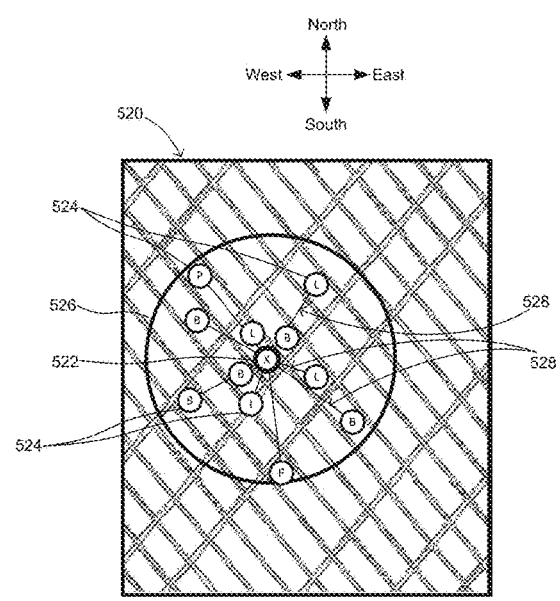
FIG. 5A
FIG. 5B

STABLE ORIENTATION CUES FOR AUGMENTED REALITY (AR)

CROSS-REFERENCE TO RELATED APPLICATION

This application is a national phase entry under 35 U.S.C. § 371 of International Application No. PCT/US20201040893, filed Jul. 6, 2020, the entire disclosure of which is incorporated herein by reference.

BACKGROUND

Many devices, including smartphones and smartwatches, provide for geographic location identification and routing or navigation assistance. However, it can be difficult for the user to figure out which direction he is facing, and therefore difficult to begin following the navigation assistance. Typically, a user must begin moving before the device can orient itself and indicate a direction of travel. As a result, the user may end up traveling in the wrong direction until the device orients itself. In addition, such a process can be slow because it waits upon movement of the user before it can provide an accurate orientation.

BRIEF SUMMARY

One aspect of the disclosure provides for a system comprising one or more processors configured to determine a location of a user device, the location being within a discrete area, determine, based on the discrete area, one or more non-visible orientation cues that correspond to one or more non-visible geographically located objects within the discrete area, wherein the non-visible geographically located objects are non-visible by the user device from the determined location, determine, based on at least the one or more non-visible orientation cues, an orientation of the user device, and provide, via the user device, an output indicating the determined orientation. The one or more processors may be further configured to receive data from one or more image sensors of the user device, and detect, based on the received data from the one or more image sensors, one or more visible orientation cues that correspond to one or more visible geographically located objects, wherein the one or more visible geographically located objects are visible by the user device from the determined location.

Determining the orientation of the user device may be further based on the one or more visible orientation cues. The discrete area may be further partitioned into a plurality of parcels, wherein the plurality of parcels are equally distributed around the determined location of the user device, and wherein each parcel of the plurality of parcels includes at least one of the one or more non-visible orientation cues. At least two of the plurality of parcels may include a first type of non-visible orientation cues. The first type of non-visible orientation cues may include a park or a body of water.

The one or more non-visible orientation cues may include a park, a body of water, an intersection, a historical landmark, a monument, a building, a town, a district, or a transit station. The discrete area may be at least one map tile of a plurality of map tiles, the plurality of map tiles corresponding to a larger geographical region. Each of the plurality of map tiles may be equal in size.

The one or more processors may be further configured to filter the one or more non-visible orientation cues based on at least one of (i) a ranking of the one or more non-visible orientation cues, the ranking being based on a radial prominence of each of the one or more non-visible orientation cues from the location of the user device, (ii) a distribution of the one or more non-visible orientation cues, the distribution being among a plurality of parcels, or (iii) an identification of the one or more non-visual orientation cues located within the predefined discrete area, the predefined discrete area being at least one map tile.

Another aspect of the disclosure provides a system comprising one or more processors configured to determine a location of a user device, the location being within a predefined discrete area, receive data from one or more image sensors of the user device, detect, based on the received data from the one or more image sensors, one or more visible orientation cues that correspond to one or more visible geographically located objects, wherein the one or more visible geographically located objects are visible by the user device from the determined location, determine, based on at least the one or more visible orientation cues, an orientation of the user device, and provide, via the user device, an output indicating the determined orientation.

BRIEF DESCRIPTION OF THE DRAWINGS

FIG. 5A is a pictorial diagram of a map defining a discrete area according to aspects of the disclosure.

FIG. 5B is a pictorial diagram of a map using orientation cues within the discrete area of FIG. 5A to determine the orientation of the device according to aspects of the disclosure.

DETAILED DESCRIPTION

Figure 1:
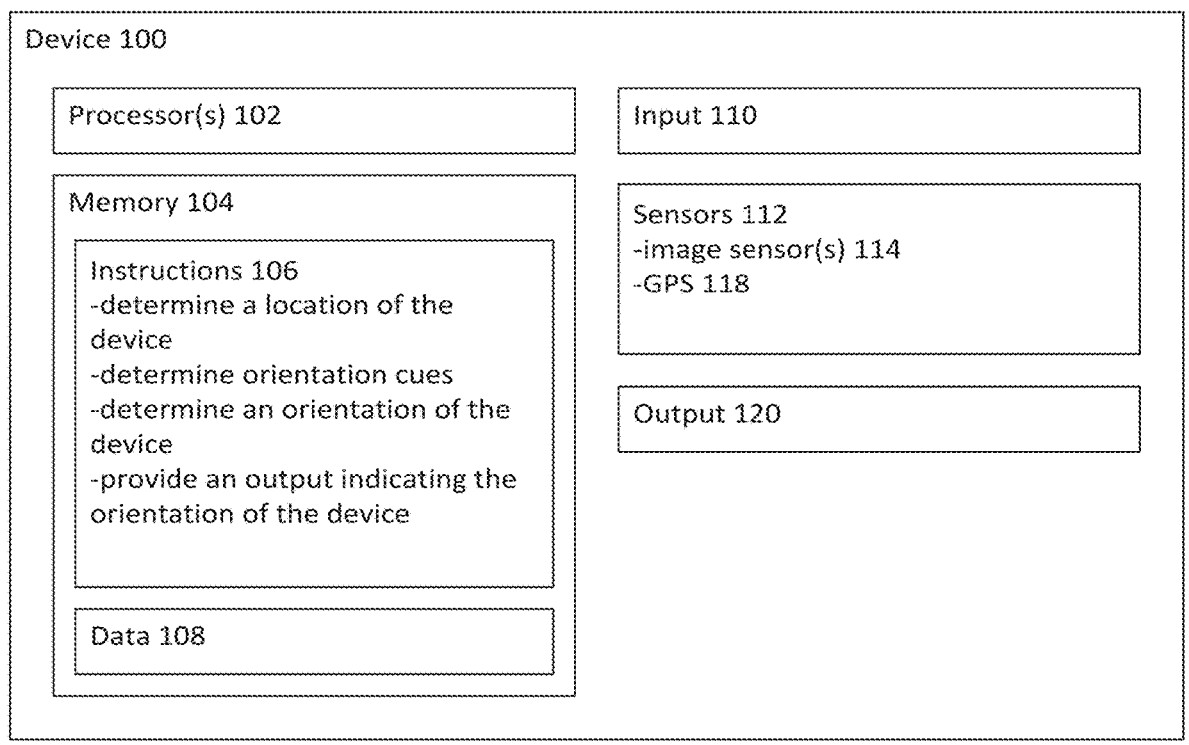
FIG. 1 is a block diagram illustrating an example device according to aspects of the disclosure.

The present disclosure relates to systems and methods that provide the orientation of a device based on one or more orientation cues. The orientation cues may be visible or non-visible with respect to the location of the device. Visible orientation cues may be orientation cues that are detected or captured by image sensors of the device. Non-visible orientation cues may not be detected or captured by the image sensors and, instead, may be identified as part of map data. Orientation cues may include landmarks, such as an iconic building or a monument, geographical features, such as a mountain range or a body of water, a geo-political boundary, such as a district or town, or any of a variety of other objects or demarcations. For example, orientation cues may include parks, bodies of water, intersections, historical landmarks, monuments, buildings, such as museums, stores, etc., transit stations, such as bus or train stations, etc. The device may obtain orientation cues relative to the location of the device. The device may receive locations of the orientation cues as part of map data.

The orientation cues detected by the image sensors and/or received as part of the map data may be based on the location of the device. For example, orientation cues may be limited to those that are visible with respect to the location of the device. Additionally or alternatively, the orientation cues may be limited to those that are within a discrete area around the device. It would be understood that using orientation cues visible to the client device, or using orientation cues that are within a discrete area around the client device, are both alternative (but not mutually exclusive) solutions to the same technical problem of efficiently determining an orientation of a client device. The discrete area may be a predefined search radius, a map tile, etc. Based on the location of the orientation cues within the discrete area, the device may determine its orientation. For example, the device may use the known locations of the orientation cues to triangulate the orientation of the device. The device may provide an output indicating the determined orientation. For example, the device may output information or images on the display that correspond to the orientation of the device and/or the user's field of view. As such, a user may be able to easily and quickly determine their orientation by means of the output on the device. The user may not be required to move in a certain direction in order to determine orientation, as is the case in conventional methods. Instead, the user may not be required to move at all since the orientation output does not rely on the user's movement. The user may not be required to perform any other action or provide an input to the device in order to determine the orientation. Instead, the present disclosure provides an automatic means for determining orientation without input or action performed by the user. By providing orientation indications in this way, the user may be able to navigate using a map on the device more easily, and may be able to reconcile map information with his or her real-world perspective more easily. The disclosed systems and methods therefore provide an efficient means for assisting a user in the technical task of determining orientation or in navigation, for example navigating to a destination location.

FIG. 1 provides an example block diagram illustrating components of the device. As shown, the device 100 includes various components, such as one or more processors 102, memory 104, and other components typically present in microprocessors, general purpose computers, or the like. Device 100 also includes input 110, an output 120, and sensors 112. The sensors may include one or more image sensors 114, and/or an accelerometer, and/or a global positioning system ("GPS") sensor 118.

The one or more processors 102 may be any conventional processors, such as commercially available microprocessors. Alternatively, the one or more processors may be a dedicated device such as an application specific integrated circuit (ASIC) or other hardware-based processor. Although FIG. 1 functionally illustrates the processor, memory, and other elements of device 100 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of device 100. Accordingly, references to a processor or computing device will be understood to include references to a collection of processors or computing devices or memories that may or may not operate in parallel.

Memory 104 may store information that is accessible by the processors 102, including instructions 106 that may be executed by the processors 102, and data 108. The memory 104 may be of a type of memory operative to store information accessible by the processors 102, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 106 and data 108 are stored on different types of media.

Data 108 may be retrieved, stored or modified by processors 102 in accordance with the instructions 106. For instance, although the present disclosure is not limited by a particular data structure, the data 108 may be stored in computer registers, in a relational database as a table having a plurality of different fields and records, XML documents, or flat files. The data 108 may also be formatted in a computer-readable format such as, but not limited to, binary values, ASCII or Unicode. By further way of example only, the data 108 may be stored as bitmaps comprised of pixels that are stored in compressed or uncompressed, or various image formats (e.g., JPEG), vector-based formats (e.g., SVG) or computer instructions for drawing graphics. Moreover, the data 108 may comprise information sufficient to identify the relevant information, such as numbers, descriptive text, proprietary codes, pointers, references to data stored in other memories (including other network locations) or information that is used by a function to calculate the relevant data.

The instructions 106 can be any set of instructions to be executed directly, such as machine code, or indirectly, such as scripts, by the processor 102. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

The device 100 may further include an input 110. The input 110 may be, for example, a touch sensor, dial, button, or other control for receiving a manual command. The input 110 may, in some examples, be a microphone. The device 100 may also include an output 120. The output 120 may be, for example, a speaker.

Device 100 may include sensors 112. The sensors 112 include one or more image sensors 114 for detecting features and/or objects around the device 100. The features and/or objects may be, in some examples, orientation cues. The one or more image sensors 114 may convert optical signals into electrical signals to detect, or capture, orientation cues around the device 100. The one or more image sensors may include, for example, a charge coupled device ("CCD") sensor, a complementary metal oxide semiconductor ("CMOS") sensor, or a camera. The one or more processors 102 may process the orientation cues detected by the one or more image sensors 114 to identify at least one detected orientation cue. The one or more image sensors 114 may be located on an edge of the device 100, a back of the device 100, or in any other location.

Sensors 112 may further include GPS sensors 118 or other positioning elements for determining the location of device 100. The location of the device may be the latitudinal and longitudinal coordinates of the device 100. According to some examples, the location of device 100 may be a relative location, such as a location relative to object depicted on a map or an orientation cue.

It should be understood that the device 100 may include other components which are not shown, such as a battery, charging input for the battery, signals processing components, etc. Such components may also be utilized in execution of the instructions 106.

Figure 2:
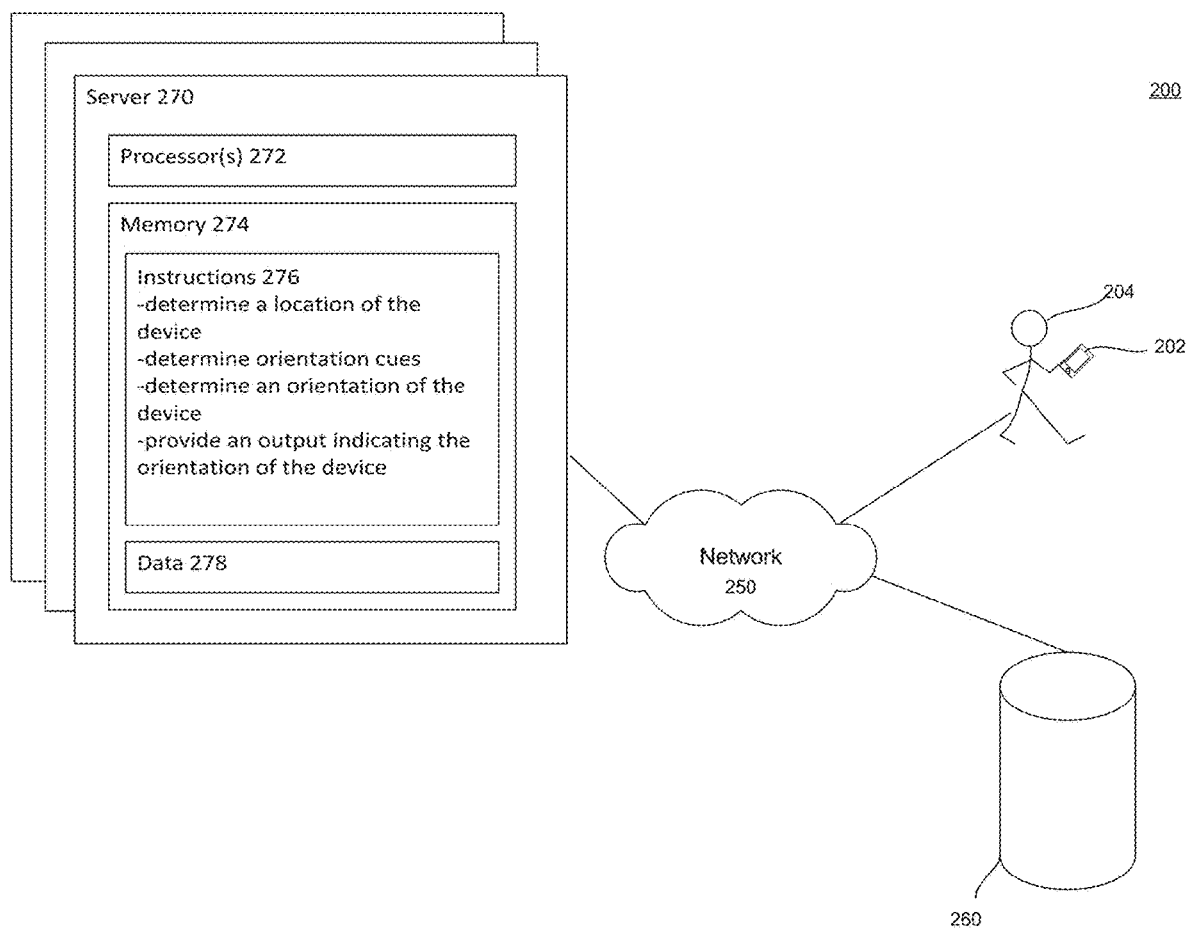
FIG. 2 is a functional diagram of an example system according to aspects of the disclosure.

FIG. 2 illustrates an example system 200 in which the features described herein may be implemented. It should not be considered limiting the scope of the disclosure or usefulness of the features described herein. In this example, system 200 may include a of device 202, user 204, server computing device 270, storage system 260, and network 250.

The device 202 may be a personal computing device intended for use by a user 204 and have all of the components normally used in connection with a personal computing device, as described above with relationship to device 100, including a one or more processors (e.g., a central processing unit (CPU)), memory (e.g., RAM and internal hard drives) storing data and instructions, a display (e.g., a screen, a touch-screen, or other device such as a smart watch display that is operable to display information), and user input devices (e.g., a keyboard, touchscreen or microphone). The devices 202 may also include a camera, speakers, a network interface device, and all of the components used for connecting these elements to one another. As mentioned above, the devices 202 may further include the image sensors. The image sensors may capture visible orientation cues.

Device 202 may be capable of wirelessly exchanging and/or obtaining data over the network 250. Device 202 may exchange information pertaining to the captured visible orientation cues. In particular, device 202 may exchange information pertaining to the visible orientation cues to server 270 such that server 270 may determine an orientation of device 202. In some examples, device 202 may obtain map data over network 250. The map data may include an indication of the location of device 202. Additionally or alternatively, the map data may include information pertaining to non-visible orientation cues.

Although the devices 202 may each comprise mobile computing devices capable of wirelessly exchanging data with a server over a network such as the Internet, they may alternatively comprise a full-sized personal computing device. By way of example only, devices may be mobile phones or devices such as a wireless-enabled PDA, a tablet PC, a wearable computing device (e.g., a smartwatch, headset, smartglasses, virtual reality player, other head-mounted display, etc.), or a netbook that is capable of obtaining information via the Internet or other networks.

The devices 202 may be at various nodes of a network 250 and capable of directly and indirectly communicating with other nodes of network 250. Although four (4) devices are depicted in FIG. 2, it should be appreciated that the system 200 can include one or more devices, with each computing device being at a different node of network 250. The network 250 and intervening nodes described herein can be interconnected using various protocols and systems, such that the network can be part of the Internet, World Wide Web, specific intranets, wide area networks, or local networks. The network 250 can utilize standard communications protocols, such as WiFi, that are proprietary to one or more companies. Although certain advantages are obtained when information is transmitted or received as noted above, other aspects of the subject matter described herein are not limited to any particular manner of transmission.

In one example, system 200 may include one or more server computing devices having a plurality of computing devices, e.g., a load balanced server farm, that exchange information with different nodes of a network for the purpose of receiving, processing and transmitting the data to and from other computing devices. For instance, one or more server computing devices 270 may be a web server that is capable of communicating with the one or more devices 202 via the network 250. In addition, server computing device 270 may use network 250 to transmit and present information to a user 204 of one of the other devices 202. Server computing device 270 may include one or more processors 272, memory 274, instructions 276, and data 278. These components operate in the same or similar fashion as those described above with respect to device 100.

Storage system 260 may store various types of information. For instance, the storage system 260 may store map data. The map data may include, for example, locations of orientation cues, such as the location of landmarks, geographical features, geo-political boundaries, etc. This information may be retrieved or otherwise accessed by a service computing device, such as one or more server computing devices 270, in order to perform some or all of the features described herein.

Figure 3:
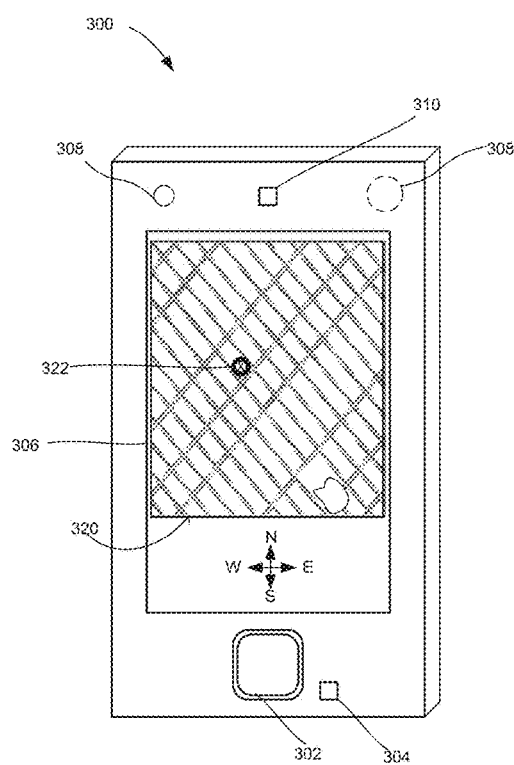
FIG. 3 is a pictorial diagram illustrating use of a device according to aspects of the disclosure.

FIG. 3 illustrates an example device 300. While in this example the device 300 is a mobile phone it should be understood that in other examples the device may be any of a variety of different types. The device 300 may include input, a display, sensors, internal electronics, and output.

The input may include a user input 302, such as those described with respect to device 100. The input may include a microphone 304 for receiving a verbal command or audio input.

The display 306 may be any type of display, such as a monitor having a screen or a touch-screen. As shown in FIG. 3, the display may be a touch-screen of a mobile device. In some examples, the display is a lens of smart glasses or the screen of an augmented reality ("AR") or virtual reality ("VR") headset. As shown in FIG. 3, display 306 may display a map 320 indicating a location 322 of the device. In some examples, display 306 may display the map in a first person point of view. That is, the map may be shown as an overlay of what is visible to the user. This may allow a user to more easily reconcile the map view with what is visible to him or her, which also further assists the user when navigating using the map.

The sensors may include an image sensor 308, including those described with respect to device 100. While two (2) image sensors 308 are shown, the device 300 may have any number of image sensors 308. The image sensors 308 may be any sensors capable of receiving imagery. The image sensors 308 may capture orientation cues that are within the field of view of the image sensors 308. Information regarding the captured orientation cues may be used to determine further information, such as the orientation of device 300. According to some examples, determining an orientation of the device is performed using information captured at the device itself. This is advantageous because the orientation can be determined using functionality of the device itself (i.e. the image sensors on the device), rather than using map data which may need to be downloaded and stored at the device. This may minimize the necessary communication with a server and rely on data captured at the client device in order to determine orientation at the device.

The captured orientation cues need not be displayed on the display 306 of device 300. According to some examples, the orientation cues that are captured by the image sensors 308 may not be saved as a picture or image to device 300. This may conserve the memory of the device. The captured images may not be images that the user desires to store on the device, and so storing them would be wasting the limited storage space of the device. By not storing the images on the device, the device may make better use of storage space on the device. According to some examples, the pictures may be temporarily stored at the device and deleted after the orientation has been determined.

The sensors may further include GPS sensors. The GPS sensors may provide a rough indication as to the location of the device. The orientation cues captured by image sensors 308 may be used to refine the orientation of device 300 at the location indicated by the GPS sensors or vice versa.

The internal electronics may include, for example, one or more processors or other components adapted to process the orientation cues captured by the image sensors 308. The one or more processors or other components may be configured to receive map data from a server. The received map data may include non-visible orientation cues. For example, non-visible orientation cues may be orientation cues that are not detected or captured by the image sensors 308. The received map data may further include orientation cues that would be visible to the client device, but are nonetheless still provided as part of the received map data. Either or both the visible and non-visible orientation cues may be processed to determine the orientation of device 300. The orientation of the device may be based on the location of device 300 with respect to the visible orientation cues, captured by the image sensors or received as part of the map data, and/or non-visible orientation cues that have been provided to the device with the map data. Using map data to determine the orientation of the device and, therefore, the user, may allow the orientation of the device and/or user to be determined regardless of whether the device has image sensors or not. This may allow for a broader range of devices that do not include image sensors, such as tablets or laptops, to be able to determine the orientation of the device and user.

The system provides many solutions for solving technical problem of efficiently determining the orientation of a client device. According to one example, determining the orientation of the device may be based on one or more visible orientation cues captured by image sensors on the device. Additionally or alternatively, determining the orientation of the device may be based on one or more orientation cues, whether visible or non-visible, that are part of map data received at the client device.

The output 310 may include one or more speakers for outputting audio, such as playback of music, speech, or other audio content. According to some embodiments, the output may also be the display 306.

Figure 4:
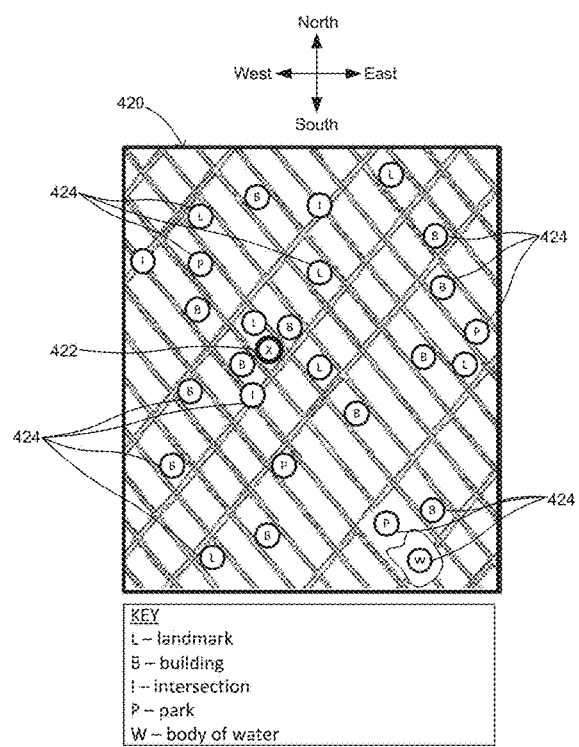
FIG. 4 is a pictorial diagram of a map determining the location of orientation cues according to aspects of the device.

FIG. 4 illustrates a map indicating a plurality of orientation cues. For purposes of clarity, not all orientation cues 424 are identified by their reference number on map 420. Instead, or in addition to the identification by reference number, the orientation cues 424 are identified by the type of orientation cue. The type of orientation cues may include, for example, landmark "L," building "B," intersection "I," park "P," and body of water "W." There are merely some examples of orientation cues and are not intended to be limiting to the types of orientation cues that may appear on map 420 or be used to determine the orientation of the device.

While a plurality of orientation cues are shown on map 420, all, some, or none of the orientation cues may be output to the user. That is, the map as shown on the display of the device may include all, some, or none of the orientation cues. Additionally or alternatively, the map, as shown on the display of the device, may display the orientation cues as a pin marking the location of the buildings, landmarks, parks, bodies of water, etc. In some examples, the buildings, landmarks, geographical, geo-political, etc. orientation cues may be displayed as two-dimensional or three-dimensional renderings on map 420 to provide a more interactive or realistic image.

As shown in FIG. 4, a plurality of orientation cues 424 are identified as being near the location 422 of the device. The orientation cues 424 may include landmarks "L," buildings "B," intersections "I," parks "P," and bodies of water "W." Landmarks may include, for example, locally identified landmarks, such as an iconic restaurant or building, or historical landmarks, such as Ellis Island in New York City, New York, the Lincoln Memorial in Washington D.C., or the USS Arizona Memorial in Honolulu, Hawaii. It would be appreciated that these are some specific and non-limiting examples of landmarks. The specific landmarks identified as orientation cues will depend on the location of the device itself. Generally, if the device is located in a certain city, town, or other geographical area, the orientation cues may be landmarks within that geographical area. Buildings may include, for example, museums, stores, skyscrapers, etc. Intersections may include iconic or easily identifiable intersections, such as Times Square in New York City, New York, Shibuya Crossing in Tokyo, Japan, or the intersection of Portage and Main in Winnipeg, Canada. While only landmarks, buildings, intersections, parks, and bodies of water are identified in FIG. 4, orientation cues may further include other features, such as geo-political boundaries. For example, such geo-political boundaries may include the geographical boundary of a district within a town, the boundary of the town within the county, etc. Additionally or alternatively, orientation cues may include geographical features, such as mountain ranges, islands, etc., and/or points of interest, such as tourist attractions or famous locations.

The orientation cues 424 may be visible or non-visible with respect to the device. For example, visible orientation cues may be orientation cues that can be detected using the image sensors of the device. That is, the orientation cues may be in the field of view of the device and/or the user. Non-visible orientation cues may be orientation cues that are located near the determined location of the device but are not able to be detected by the image sensors or seen by the user, for example because those orientation cues are not in the field of view of the image sensors, or they obscured by other features in the field of view, or because those orientation cues are too far away from the location of the device to be detected.

According to some examples, the user may select or identify points of interest that are significant with respect to the location of the device to populate the map data with orientation cues. For example, the user may identify buildings, landmarks, geo-political features, and/or geographical features that are well known to the users in that geographical area. The orientation cues identified by the user may be an orientation cue that many users in that geographical area would be able to identify or recognize. The orientation cues identified by the user may be saved as part of the map data. It would be appreciated that user-identified orientation cues in this manner may be used instead of, or in addition to, either or both of: orientation cues detected by image sensors on the user device; and orientation cues received from a server. More generally, the disclosed methods and systems may use one or more different means for obtaining orientation cues, including: capturing visible orientation cues using image sensors on the client device, receiving map data including visible or non-visible orientation cues from a server, and orientation cues selected or identified by the user.

In some examples, the orientation cues may be predetermined for a given area. Predetermined orientation cues may be orientation cues that a plurality of users may readily recognize. Additionally or alternatively, predetermined orientation cues may be orientation cues may be the orientation cues that are the most relevant for that geographic region.

The orientation cues 424 may be associated with the map data. For example, map data and its associated orientation cues may be stored in storage system 260, as described above. Additionally or alternatively, map data and its associated orientation cues may be stored in server system 270, also described above. The map data may include location information for each of the orientation cues. The location information may include the latitude and longitude of the orientation cue. In some examples, the location information may include the relevant location of the orientation cue with respect to other orientation cues. Additionally or alternatively, the map data may include information pertaining to the appearance of the orientation cue. For example, the map data may include images, such as a picture or panorama, or three-dimensional renderings corresponding to the orientation cues. Orientation cues captured by the image sensors may be compared to the images or renderings stored in the map data to identify the orientation cue captured by the image sensors. This may be performed using image analysis techniques as would be apparent to the skilled person. For example, the comparison may involve identifying features in the images captured by the image sensors and comparing those features with features in the images or renderings stored in the map data. This is advantageous because the orientation cues used to determine the orientation of the device are identified based on what is actually visible to the user (and to the image sensors). This helps to provide an accurate determination of orientation since the determination is based on first-hand data captured using the device itself. What is more, this method negates the need for information regarding the location of the device (for example using GPS), since the orientation can be determined from the comparison of the captured images alone. Thus this method can be performed in scenarios where GPS information is not available.

The orientation cues may be ranked. Ranking the orientation cues may include using a density filter. The density filter may order the possible orientation cues by relevance. Relevant orientation cues may be those with a highest rank of relevance as a point of interest within a discrete area around the location of the device. For example, a relevance ranking may be based on a distance of the orientation cue to the location of the device, or any other suitable factor that can be used to determine relevance. Thus, the density filter may filter the orientation cues such that the most relevant points of interest within the discrete area are used in calculating the orientation of the device.

According to some examples, once the orientation cues 424 are ranked, the orientation cues 424 may be filtered. For example, the orientation cues may be filtered such that the top thirty (30) orientation cues are used to determine the orientation of the device. The orientation cues may be filtered such that the top 3, 10, 16, 21, 24, etc. cues are used to determine the orientation of the device and, therefore, the user. Thus, using thirty orientation cues is merely one example and is not intended to be limiting. More generally, any number of orientation cues can be used to determine the orientation of the device.

Additionally or alternatively, the density filter may filter the orientation cues based on the distance of the orientation cues from the location of the device. The density filter may filter the orientation cues such that only orientation cues within a certain threshold distance are used to determine the orientation of the device. For example, the density filter may filter the orientation cues such that only cues within 100 feet, 225 feet, 337 feet, 1000 feet, etc. of the location of the device are used to determine the orientation of the device. More generally, the threshold distance may be any suitable distance as would be understood by the skilled person. The threshold distance set by the density filter may be based on the location of the device and may, therefore, and be considered as a radius measured from the location of the device. In examples when the location of the device is in a city, where there may be numerous orientation cues, the radius set by the density filter may be smaller as compared to when the location of the device is in a rural area, where there may be few orientation cues nearby. More generally, the radius may be set such that at least a predefined number of orientation cues are included within the radius, and so the radius may vary depending on the density of orientation cues in the geographic area of the location of the device. Alternatively, the radius may be fixed irrespective of the location of the device.

According to some examples, the orientation cues may be filtered based on type. For example, orientation cues may be classified as an orientation cue type. Orientation cue types may include buildings, geographical features, geo-political boundaries, among other types. The orientation cues may be filtered based on type such that one or more types of cues are included or excluded. For example, geographical features may be excluded from being identified as an orientation cue. This may be particularly useful when the location of the device is in a densely populated location such as a city, where geographic features are less prevalent and can therefore be excluded and not used in determining the orientation of the device. More specifically, some orientation cue types, such as buildings, may be further classified as a building type, such as museums, stores, lodging, among other building types. The orientation cues may be filtered further based on building type. For example, lodging, such as hotels, residential real-estate, etc. may be excluded from being identified as an orientation cue.

In yet another example, the orientation cues may be filtered based on whether the orientation cues are visible or non-visible. As described above, visible orientation cues may be orientation cues that are detected and/or identified using the image sensors of the device. That is, visible orientation cues 424 are visible with respect to the location of the device such that they can be detected by the image sensors. For example, orientation cues in which the appearance is known may be identified by comparing what is detected by the image sensors to the known appearances of the orientation cues. In other words, orientation cues captured by image sensors on the device may be compared to images or renderings stored in map data in order to identify that visible orientation cue. Non-visible orientation cues may be orientation cues that cannot be detected and/or identified using the image sensors of the device as they are not visible with respect to the location of the device. For example, if the orientation cue is not within the field of view of the image sensor or is too far away for the detected image to be recognizable, the orientation cue may be estimated. Estimating the orientation cue may be done using an earth model that is based on geographic features and architectural structures to determine whether a straight line from the device would reach the orientation cue without intersecting with other geographic features or architectural structures.

FIGS. 5A and 5B illustrate an example in which the discrete area around the determined location of the device is defined by a certain distance from the location of the device. As shown, the discrete area is defined by a circle with a predefined radius in this example. However, it would be appreciated that the methods discussed below in reference to these figures may equally use another other type of suitable discrete area, such as a map tile. In this example, the radius may be determined based on the density of orientation cues within the geographical region of the location of the device. For example, in a region that has a low density of orientation cues, a larger radius may be used such that a larger number of orientation cues may be within the discrete area. In a region with a high density of orientation cues, a smaller radius may be used such that a smaller number of orientation cues may be within the discrete area. Thus, the size of the discrete area may vary depending on the location of the device.

As shown in FIG. 5A, the location 522 of the device may be identified on map 520. A discrete area 526 may be determined based on the location 522 of the device. The discrete area 526 may have a radius "R," as measured from the location 522 of the device to the boundary of the discrete area 526. A plurality of the orientation cues 524 may be located within the discrete area 526 and a plurality of the orientation cues 524 may be located outside of the discrete area 526.

FIG. 5B illustrates how the orientation cues 524 located within discrete area 526 may be used to determine the orientation of the device. As shown in FIG. 5B, the orientation cues 524 located outside of the discrete area 526 may be removed from the map as they may not be necessary and/or relevant for determining the orientation of the device. This is advantageous because the irrelevant or unnecessary cues are excised, keeping the process of determining the orientation of the device lean and efficient. In more detail, only the necessary cues are used to determine the orientation, which minimizes the processing power and number of computations required to perform the process. In some examples, only orientation cues 524 located within discrete area 526 are used determine the orientation of the device. Reference lines 528 may be drawn from each orientation cue 524 within the discrete area 526 to the location 522 of the device. In some examples the reference line may be inferenced, such that a line is never actually drawn on the client device or otherwise. Instead, the reference line may be determined in order to find a relative location and distance of the orientation cue. The reference line 528 extending from each orientation cue 524 may provide the location and distance of the orientation cue 524 with respect to the location 522 of the device. The location and distance of each orientation cue 524 may be used to determine the orientation of the device. For example, the orientation of the device may be determined by triangulating the position of the device with the position of the orientation cues. Therefore, a user of the client device is able to easily determine his or her orientation, based on the orientation of the device. This does not require the user to move in any direction (to track the movement of a marker on a map, for example, to determine the direction they are heading in), but instead this automatically provides the user with orientation information without requiring any specific action or input from the user. The user is therefore able to more easily navigate since they are able to easily determine their orientation, which is necessary to navigate effectively.

As shown, each of the orientation cues 524 within the discrete area 526 may be used to determine the orientation of the device. According to some examples, visible orientation cues, such as visible geographically located objects, may be used to determine the orientation of the device. Additionally or alternatively, only non-visible orientation cues, such as non-visible geographically located objects, may be used to determine the orientation of the device. In yet another example, both visible and non-visible orientation cues 524 within the discrete area 526 may be used to determine the orientation of the device.

The orientation cues 524 within the discrete area 526 may be filtered prior to determining the orientation of the device. For example, the orientation cues 524 may be filtered to use only the five (five), or any other set number, orientation cues 524 closest to the user. In another example, the orientation cues 524 may be filtered to use only buildings "B" and landmarks "L" to determine the orientation of the device, or any other one or more suitable orientation cue types. In yet another example, the orientation cues 524 may be filtered based on the rank of the orientation cues 524. The rank may be based on relevance. For example, an orientation cue that is closer to the location of the device, has a higher publically accessible rating, etc. may be factors in determining the relevance of the point of interest These are merely a few examples and are not meant to be limiting on the types of filtering that may occur.

Figure 6A:
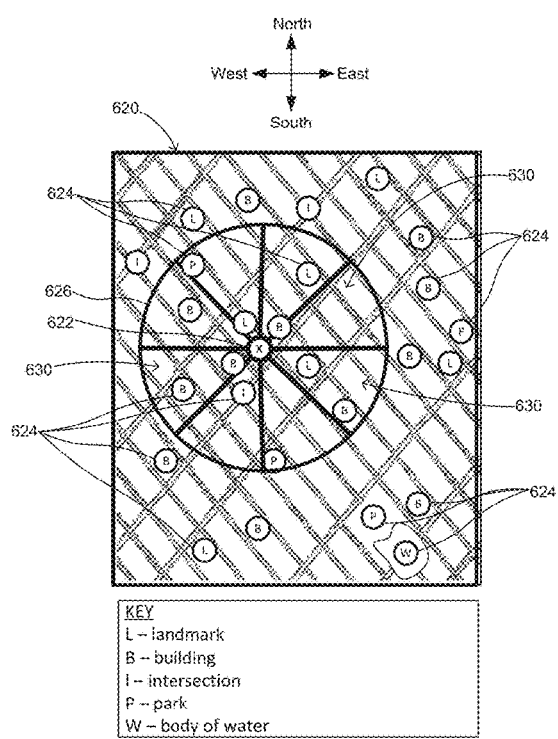
FIG. 6A is a pictorial diagram of a map defining a discrete area according to aspects of the disclosure.
Figure 6B:
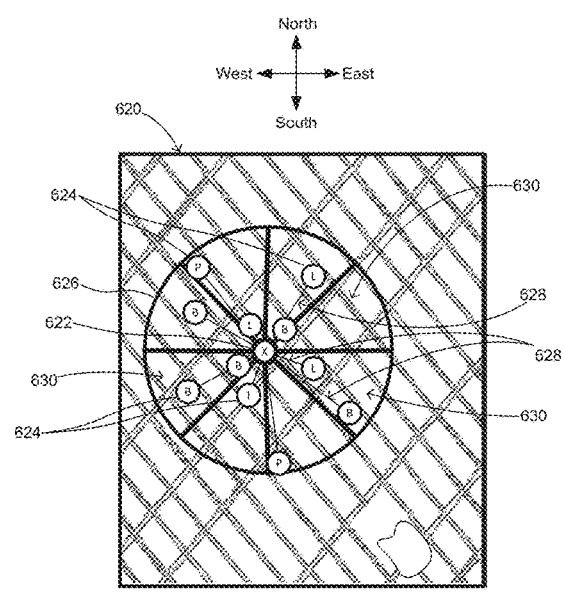
FIG. 6B is a pictorial diagram of a map using orientation cues within the discrete area of FIG. 6A to determine the orientation of the device according to aspects of the disclosure.

FIGS. 6A and 6B illustrate an example in which the discrete area is further partitioned into a plurality of parcels. In particular, the discrete area 626 within map 620 is divided into equal parcels 630 that surround the location 622 of the device. As shown, the discrete area 626 is divided into eight (8) parcels 630, however, the discrete area 626 may be divided into three (3), six (6), ten (10), or any other number of parcels. Thus, dividing the discrete area 626 into eight parcels 630 is merely one example and is not intended to be limiting. Moreover, while the discrete area 626 is shown as a circle and the parcels 630 as substantially triangular, such that the parcels are segments of the circular discrete area, the discrete area 626 may be a different shape, such as a square, triangle, polygon, etc. A change in shape of the discrete area 626 may result in a change of shape of the parcels 630, such that the parcels 630 remain equal in size and evenly distributed around the location 622 of the device.

Dividing the discrete area 626 into parcels 630 may maximize the distribution of the orientation cues 624 around the location 622 of the device. As shown in FIG. 6B, all the orientation cues 624 located within the discrete area 626 are shown. According to some embodiments, the orientation cues 624 may be filtered such that only a certain number of orientation cues 624 are located within each parcel 630. This is advantageous because the number of orientation cues required (and thus processing power required) is minimized. The remaining orientation cues can thus be evenly distributed around the location of the device. An even distribution of orientation cues is advantageous because this helps to provide more accurate results when determining orientation. In some examples, the orientation cues may be filtered based on their rank, distance from location 622, type, etc. For example, the orientation cues 624 may be filtered such that at least two of the parcels 630 includes a first type of visible and/or non-visible orientation cue. In some examples, the first type of orientation cues 624 may be a park or a body of water. In other examples, the first type of orientation cues 624 may be a building or a landmark. The first type of orientation cues may be predefined based on the geographic region, prevalence of the type of orientation cue in the geographic region, etc.

Once the orientation cues 624 are filtered, one or more orientation cues 624 may identified for each parcel 630. The orientation cues 624 within the parcels 630 and/or the references lines 628 may then be used to determine the orientation of the device, similar to the process described with respect to FIGS. 5A and 5B.

Figure 7A:
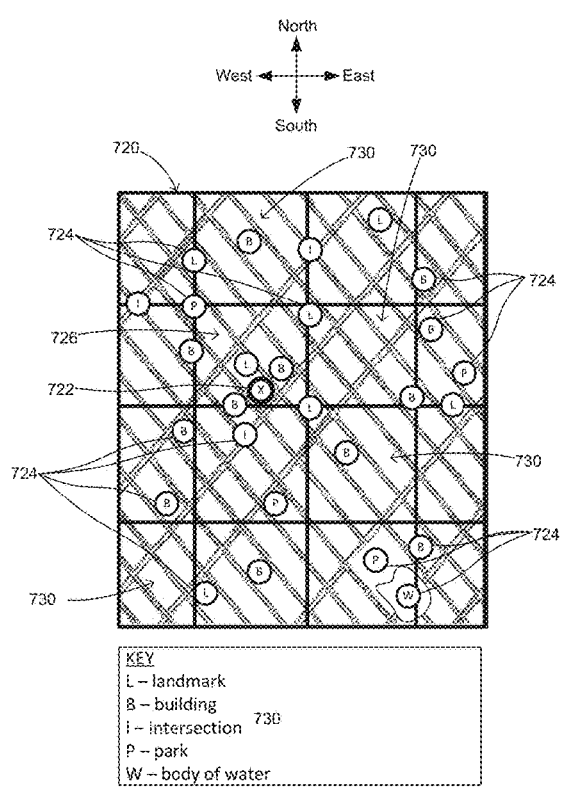
FIG. 7A is a pictorial diagram of a map defining a discrete area according to aspects of the disclosure.
Figure 7B:
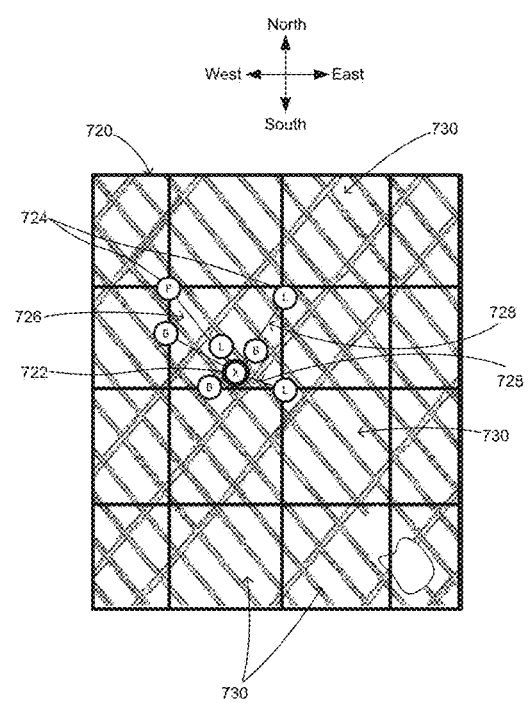
FIG. 7B is a pictorial diagram of a map using orientation cues within the discrete area of FIG. 7A to determine the orientation of the device according to aspects of the disclosure.

FIGS. 7A and 7B illustrate an example in which the discrete area is a map tile. The map 720 of the geographic region may be divided into map tiles 730. The map tiles 730 may be determined independent of the location of the device. That is, the map tiles 730 will be the same or substantially the same for any device in the geographic region, regardless of the location of the device. Each map tile 730 may include orientation cues 724. The orientation cues 724 within each map tile 730 may be predetermined. For example, the map data stored in server computing device 270 or storage system 260 may include data regarding the orientation cues 724, and their respective locations, within each map tile 730.

Having the map data include information regarding the orientation cues 724 may provide for consistent results and result in lower processing power being required. This is because the orientation cues are predetermined and so a step of determining orientation cues near to or surrounding the client device is not necessary. For example, as map tiles 730 are consistent regardless of the location of the device and include predetermined orientation cues 724, determining the orientation of a device will be based on the same orientation cues 724 regardless of the where in the map tile 730 the device is located. Further, as the map tiles 730 are predefined, the device and/or server 270 may not have to determine the orientation cues 724 with respect to the location 722 of the device. Instead, the server 270 may provide the orientation cues 724 within map tile 726 in which the device is located. This is advantageous because the processing power required to determine orientation is reduced, since the orientation cues no longer need to be identified as the orientation cues may already be identified in the map data. In some examples, such as when there is a low density of orientation cues 724 in map tile 726, server 270 may provide the orientation cues 724 from the maps tiles 730 surrounding map tile 726 and the location 722 of the device.

FIG. 7B illustrates how the orientation cues 724 within map tile 726 may be used to determine the orientation of the device. As shown, orientation cues 724 located outside of map tile 726 may be removed from the map 720 as they may not be necessary and/or relevant for determining the orientation of the device. As mentioned above, excising unnecessary orientation cues is advantageous because the processing power and number of computations required to determine the orientation is minimized as reference lines may not need to be drawn to the superfluous orientation cues. Reference lines 728 may be drawn, or inferenced, from each orientation cue 724 to the location 722 of the device. The reference line 728 may indicate the location and distance of the orientation cue 724 with respect to the location 722 of the device. The location and distance of each orientation cue 724 may be used to determine the orientation of the device, as described with respect to FIGS. 5A and 5B.

Figure 8A:
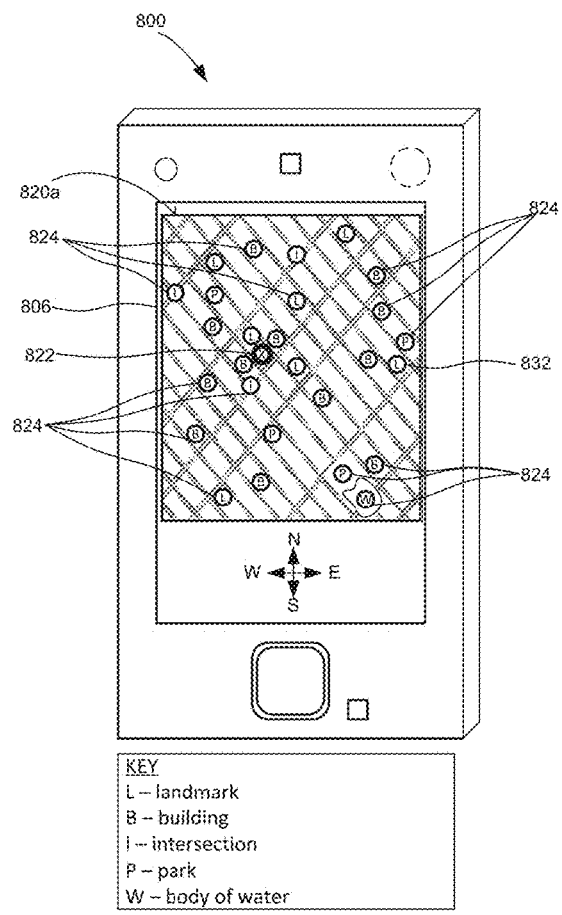
FIG. 8A is a pictorial diagram of a device providing an output indicating the location of the device and orientation cues according to aspects of the disclosure.
Figure 8B:
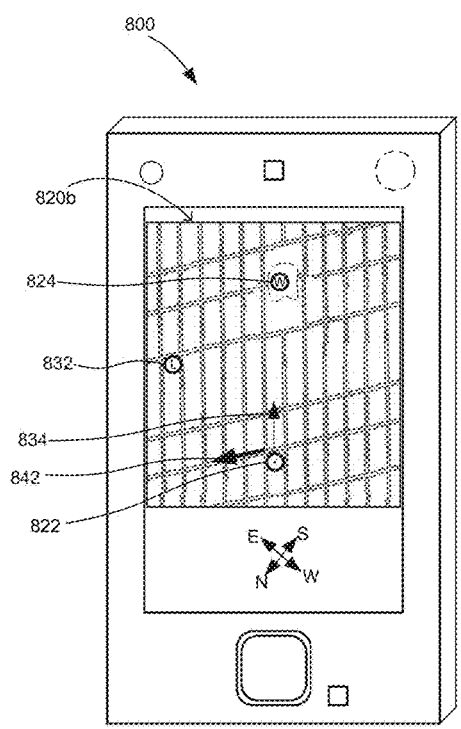
FIG. 8B is a pictorial diagram of a device providing an output indicating the orientation of the device according to aspects of the disclosure.
Figure 8C:
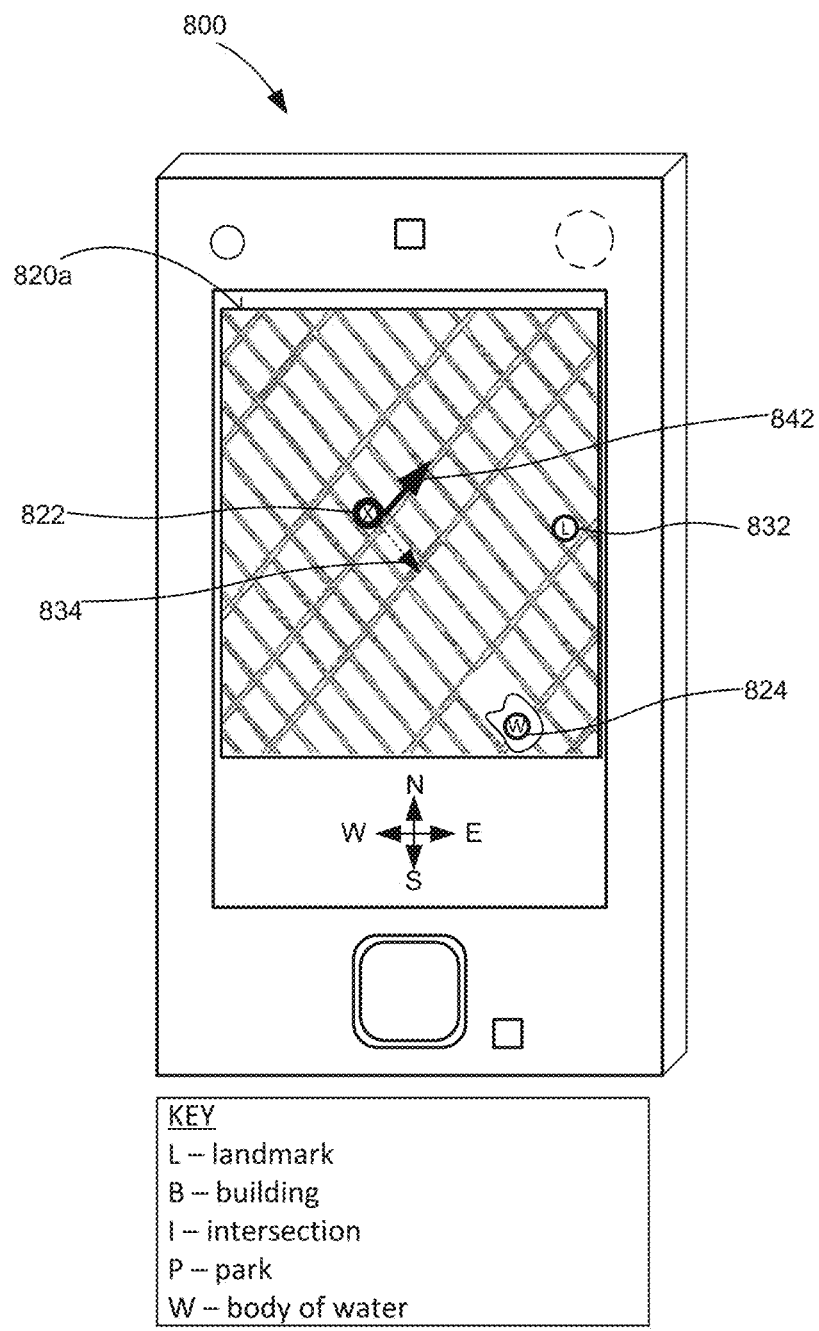
FIG. 8C is a pictorial diagram of a device providing an output indicating the orientation of the device according to aspects of the disclosure.

FIGS. 8A-8C illustrate an example in which the orientation cues around the location of the device are used to determine the orientation of the device and provide an output indicating the determined orientation. The location 822 of the device may be determined and displayed on map 820a. A plurality of orientation cues 824 may be identified. The orientation cues 824 may or may not be output for display on display 806 of the device 800. In some examples, the orientation cues 824 may be output as places of interest instead of an orientation cue 824.

The device 800 may receive an input indicating the intended destination 832 of the user. The intended destination 832 may, according to some examples, be an orientation cue 824. In examples where the intended destination 832 is an identified orientation cue 822, the intended destination 832 may be used to determine the orientation of the device 800. As shown, intended destination 832 may be a landmark "L" and, therefore, also an orientation cue 824.

The orientation cues 824 may be filtered by defining a discrete area as described above, optionally further defining the discrete area into a plurality of parcels, and/or identifying the map tile that includes the location 822 of the device 800. For example, the orientation cues may be filtered based on a ranking of the orientation cues. The ranking may be based on a radial prominence, or distance, form the location of the device. In some examples, the ranking may be based on relative interest of the orientation cue. The orientation cues may be fileted based on the distribution of the orientation cues around the location of the dev ice, such that the orientation cues that are used for determining orientation are equally distributed around the location of the device, in order to provide accurate orientation information whilst minimizing the number of orientation cues required. For example, the distribution may be done based on how many orientation cues are in each parcel within the discrete area. Additionally or alternatively, the orientation cues may be filtered based on whether the orientation cue with within a map tile that includes the location of the device.

Additional filtering, as described above, may be applied to filter the orientation cues 824 used to determine the orientation of the device 800.

Determining the orientation of the device based on orientation cues may be helpful in situations where the user may or may not be familiar with the location, however it would be appreciated that providing an orientation of a device is beneficial to the user in many other situations when navigating using a map or more generally viewing a map. Determining the orientation of the device based on orientation cues is particularly helpful in all circumstances, since this does not require the client device to move in a particular direction (in order to determine on a map which direction the device is moving in), but instead the orientation is able to be provided without movement of the client device or indeed any other action or input from the user, instead only requiring the orientation cues which may be automatically captured by image sensors or otherwise determined from map data received at the device. According to one example, a user may be visiting New York City and may not be familiar with the Manhattan area. To help move around the city quickly, the user may have taken a subway from one part of the city to another. However, upon leaving the subway station, the user may be disoriented, as all the streets look substantially similar and there may not be salient geographic features visible. Upon leaving the subway station, the user may not know which direction to begin walking to reach the intended destination. In conventional methods, the user would have to start walking in a particular direction in order to ascertain their orientation. At this time, the device may determine the location of the device 800 using GPS sensors. The device 800 may then identify orientation cues 824 using the image sensors on device 800 and/or receive orientation cues 824 from the map data. Using all or some visible and/or non-visible orientation cues, the device 800 may determine the orientation of the device 800 and, thereby, the orientation of the user without requiring the user to move in any given direction and, potentially, the wrong direction with regards to their intended destination. Once the orientation of the device 800 is determined, an output may be provided on the display 806 of the device indicating the determined orientation, thus immediately providing the user with an indication of the orientation of the device and, by extension, the user. This output is therefore useful in assisting the user in performing the technical task of navigating an area, since the output is objective information (the orientation) that helps the user easily identify their orientation and thus which direction they need to travel in. The orientation of the device 800 may be determined in any of the ways described above. According to some examples, the output may include some or all of the orientation cues used to determine the orientation of the device. For example, the output provided on display 806 of device 800 may include an indication showing the relative location of the orientation cues 824 with respect to the location 822 of the device 800. The indication may include information relating to the orientation cue 824, such as the name of the landmark, building, intersection, park, or body of water, the distance from the location 822 of device 800 to the orientation cue, publicly accessible information about the orientation cue 824, etc.

Upon determining the orientation of device 800, directions may be provided on the output in situations where the user is navigating to a destination. The directions may include an indication 842 indicating the direction the user should travel to reach the intended destination 832 based on the orientation of the device 800. By showing the orientation of device 800 via indication 834 and the direction the user should travel to reach the intended destination 832 via indication 842, the user may not have to waste time determining which direction to begin walking, for example, by trial and error. This may save the user time and frustration when orienting themselves with respect to where they are and where they want to go, thereby making navigation for a user and saving time when navigating.

As shown in Figure kA, the output of map 820a may be oriented to align with the North direction, regardless of the orientation of the device.

FIG. 8B illustrates an example output in which the output indicates the determined orientation. Once the orientation of the device 800 is determined, the orientation of the output may change to correspond to the orientation of the device 800. As shown, FIG. 8B has re-oriented map 820b, as compared to the orientation of map 820a. The determined orientation of the device 800 may be that the device 800 is facing or oriented towards the body of water "W." By orienting the output in the orientation of the device 800 and the user, a user may be able to easily interact with the map 820b as well as determine how to get to their intended destination 832 without starting off in the wrong direction. Additionally, by orienting the output in the orientation of the device and the user, if the orientation of the device changes, the user may be able to immediately see the change in orientation and thus may be able to determine their orientation using the output, even if the user's orientation changes.

FIG. 8C illustrates another example output in which the output indicates the determined orientation. Instead of changing the orientation of the map, as shown in FIG. 8B, the icon representing the location of the user device rotate or provide an indication 834 of the orientation of the device. This is advantageous because the user is immediately able to see a change in orientation and thus is always able to determine their orientation using the output, even if the user's orientation changes.

Figure 9A:
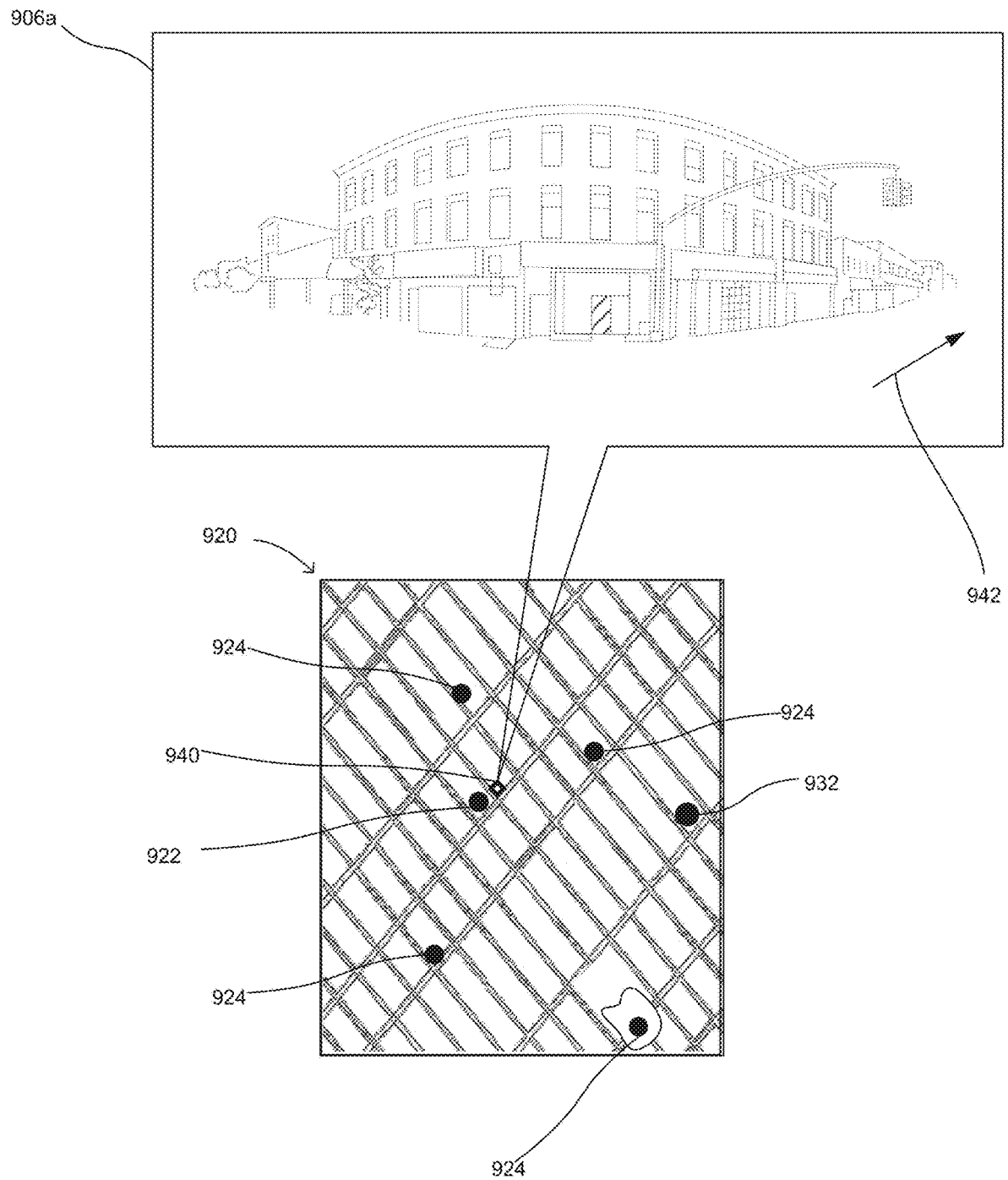
FIG. 9A is a pictorial diagram of an output indicating the orientation of the device according to aspects of the disclosure.
Figure 9B:
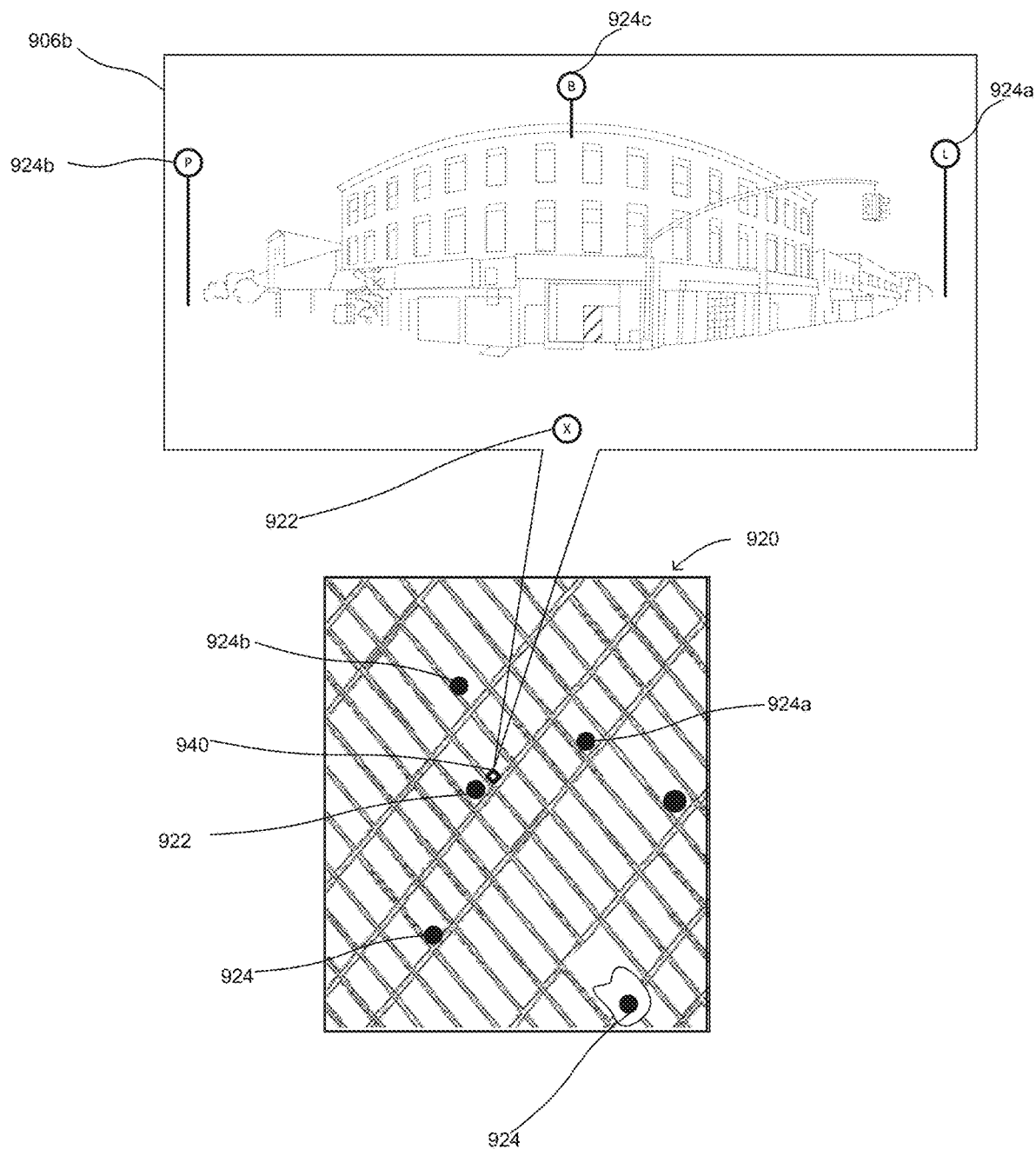
FIG. 9B is a pictorial diagram of an output indicating the orientation of the device according to aspects of the disclosure.

FIGS. 9A and 9B illustrate outputs indicating the orientation of the device. The output may be in a first person point of view, such that the output corresponds to what a user may see. This is advantageous because in this format the user is able to more easily reconcile what they can see with the determined orientation. The output may be a panorama or a three-dimensional rendering of the location of the device.

As shown in FIG. 9A, the device may be at location 922 on map 920. According to some examples, the map 920 may be shown on display 906a of the device. In another example, the map 920 may not be shown on the display 906a of the device. In such an example, the map 920 and orientation cues 924 may be used by the device and/or server to determine the orientation of the device such that only the final output may be provided for display to the user.

The location of the device may be determined by the device and/or the server using one or more sensors. Based on the location 922 of the device, the device and/or server may determine the orientation of the device according to the methods described herein. For example, the device and/or server may use orientation cues 924 and destination location 932 to determine the orientation of the device according to methods described above.

The device and/or server may determine that the device is oriented towards corner 940. The output provided by the device and/or server to display 906a of the device may indicate the orientation of the device. According to some examples, the output on display 906a may show a picture, panorama, or rendering of corner 940. The output may be in a first person orientation such that the output corresponds to the field of view of the user. In some examples, the output may be overlaid on what is seen by the user to provide an AR experience.

According to some examples, the output may also include an indication 942 of a direction the user should travel to reach the destination location 932. This is advantageous in the context of a user navigating to a destination location, since this indication of a direction that the user should travel assists the user in navigating to that destination.

As shown in FIG. 9B, the display 906b may include an output indicating the orientation of the device. The output may correspond to the field of view of the user. The output may include orientation cues 924a, 924b. 924c. The orientation cues 924a, 924b, 924c may include information about the orientation cue. The information may be displayed with the orientation cue 924a, 924b, 924c or may be displayed after an orientation cue is selected. For example, the device may receive an input, such as a touch input, selecting an orientation cue on display 906b.

While not shown, the orientation cues 924a, 924b may include a distance of how far the orientation cue 924a, 924b is from the location 922 of the device. Additionally or alternatively, the orientation cues 924a, 924b shown on display 906b may include the name of the location, park, building, etc. In other words, the information about the orientation cue may include a distance to the orientation cue and/or a name of the cue. This is advantageous because the user is able to easily identify and obtain information about orientation cues based on the output on the display and based on what is visible to the user.

Figure 10:
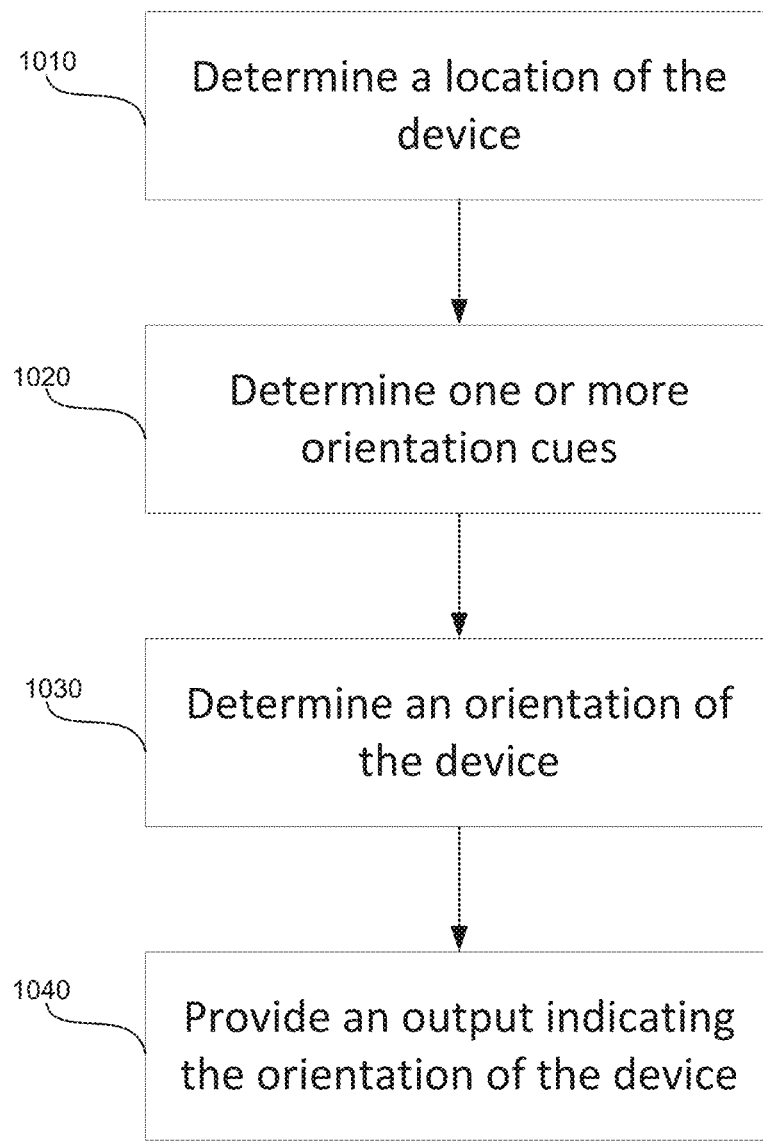
FIG. 10 is a flow diagram according to aspects of the disclosure.

FIG. 10 illustrates an example method of determining the orientation of the device. The following operations do not have to be performed in the precise order described below. Rather, various operations can be handled in a different order or simultaneously, and operations may be added or omitted. Additionally or alternatively the method may be performed on the server or on the device. In some examples, a portion of the method may be performed by the server and a portion of the method may be performed on the device.

For example, in block 1010 the location of the device may be determined. The location may be within a discrete area. The discrete area may be predetermined, such as a map tile, or may change depending upon the location of the device, such as defining a radius around the device.

In block 1020, one or more orientation cues may be determined. The orientation cues may correspond to visible and non-visible orientation cues. The visible orientation cues may be geographically located objects within the discrete area that are visible based on the location of the device. The non-visible orientation cues may be geographically located objects within the discrete area that are not visible based on the location of the device.

In block 1030, the orientation of the device may be determined based on the orientation cues. For example, the device may use the location and distance of the orientation cues with respect to the location of the device to determine the orientation of the device.

In block 1040, an output indicating the determined orientation may be provided for display on the device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system, comprising:
one or more processors configured to:
determine a location of a user device, the location being within a predefined discrete area;
receive data from one or more image sensors of the user device;
detect, based on the received data from the one or more image sensors, one or more visible orientation cues within the predefined discrete area that correspond to respective locations of one or more objects that are visible by the user device from the determined location;
determine, based on the location of the user device with respect to the one or more visible orientation cues, an orientation of the user device; and
provide, via the user device, an output indicating the determined orientation, wherein the output includes at least one of a map orientated in the determined orientation of the user device such that the map is oriented to correspond to a heading of the user device, an indication on the map identifying the determined orientation of the user device, a field of view corresponding to the determined orientation of the user device, a panorama rendering corresponding to the determined orientation of the user device, or a three-dimensional rendering corresponding to the determined orientation of the user device.

2. The system of claim 1, wherein the predefined discrete area is at least one map tile of a plurality of map tiles that define a larger geographical region.

3. The system of claim 2, wherein each of the plurality of map tiles are equal in size.

4. The system of claim 1, wherein the one or more visible orientation cues includes a park, a body of water, an intersection, a historical landmark, a monument, a building, a town, a district, or a transit station.

5. The system of claim 1, wherein the discrete area is further partitioned into a plurality of parcels, wherein the plurality of parcels are equally distributed around the determined location of the user device.

6. The system of claim 5, wherein each parcel includes at least one of the one or more visible orientation cues.

7. The system of claim 5, wherein at least two of the plurality of parcels includes a first type of visible orientation cues.

8. The system of claim 7, wherein the first type of visible orientation cues includes (i) a park or (ii) a body of water.

9. The system of claim 1, wherein the one or more processors are further configured to rank, based on radial prominence from the location of the user device, the one or more visible orientation cues.

10. The system of claim 1, wherein the one or more processors are further configured to filter the one or more visible orientation cues based on at least one of:
(i) a ranking of the one or more visible orientation cues, the ranking being based on a radial prominence of each of the one or more visible orientation cues from the location of the user device,
(ii) a distribution of the one or more visible orientation cues, the distribution being among a plurality of parcels, or (iii) an orientation cue type of the one or more visible orientation cues located within the discrete area, the discrete area being at least one map tile.

\* \* \* \* \*